United States Patent [19]

Narayan et al.

[11] 4,165,414

[45] Aug. 21, 1979

[54] URETHANE-MODIFIED ISOCYANURATE FOAMS HAVING IMPROVED INSULATING AND FLAME RETARDANT PROPERTIES

[75] Inventors: Thirumurti Narayan, Riverview; John T. Patton, Jr., Wyandotte; Moses Cenker, Trenton, all of Mich.; Harald P. Wulff, Baton Rouge, La.

[73] Assignee: BASF Wyandotte Corporation, Wyandotte, Mich.

[21] Appl. No.: 871,439

[22] Filed: Jan. 23, 1978

[51] Int. Cl.$^2$ ............... C08G 18/14; C08G 18/20; C08G 18/24; C08G 18/16
[52] U.S. Cl. ...................... 521/129; 521/117; 521/126; 521/159; 521/902; 521/124; 521/125
[58] Field of Search ............... 260/2.5 AW, 2.5 AT; 521/902, 129, 117, 159

[56] References Cited

U.S. PATENT DOCUMENTS

| | | | |
|---|---|---|---|
| 3,467,607 | 9/1969 | Kuryla | 260/2.5 AT |
| 3,746,692 | 7/1973 | Olstowski | 260/77.5 AB |
| 3,769,318 | 10/1973 | Windemuth | 260/2.5 AT |
| 3,891,579 | 6/1975 | Cenker et al. | 521/129 |
| 4,008,188 | 2/1977 | Alexander | 260/2.5 AT |
| 4,051,082 | 9/1977 | Cenker | 260/2.5 AW |

OTHER PUBLICATIONS

Vieweg et al., Polyurethane (Kunststoff-Handbuch, Band II, Hanser Verlag, Munchen, (1966), pp. 518–520.

*Primary Examiner*—H. S. Cockeram
*Attorney, Agent, or Firm*—Joseph D. Michaels; Robert E. Dunn; Bernhard R. Swick

[57] ABSTRACT

The incorporation of chloro-alkanol moieties into a urethane-modified isocyanurate foam has been found to improve the insulating properties of the foam as well as improve the flame-retardant properties thereof.

5 Claims, No Drawings

URETHANE-MODIFIED ISOCYANURATE FOAMS HAVING IMPROVED INSULATING AND FLAME RETARDANT PROPERTIES

BACKGROUND OF THE INVENTION

1. Field of the Invention

The present invention relates to urethane-modified isocyanurate foams characterized by improved insulating and flame-retardant properties. More particularly, the invention relates to the incorporation of chloro-alkanol moieties into a urethane-modified isocyanurate foam.

2. Prior Art

The preparation of urethane-modified isocyanurate foams is well known in the art. Generally these foams are prepared by catalytically condensing an organic polyisocyanate with a polyol in the presence of a trimerization catalyst and optionally a catalyst which promotes the urethane reaction. Although, the resulting foams exhibit good physical and flame-retardant properties, they generally display poor insulating properties which is expressed by the K- and aged K-factor. The K-factor is a measurement of the insulating properties (thermoconductivity) and aged K-factor indicates the loss in insulating properties with time. It is to overcome the poor insulating properties of urethane-modified isocyanurate foams to which the present invention is directed.

The most pertinent of the prior art references relating to the preparation of urethane-isocyanurate foams known to applicants is U.S. Pat. No. 3,891,579. This patent teaches the preparation of these foams employing halogenated aliphatic alkanols as accelerators for the trimerization reaction. It is taught in this patent that the use of the halogenated alkanols provides foams having improved flame-retardant properties as well as reduced friability. The invention described herein differs from that of the aforementioned patent in the amounts of chloroalkanol employed, and in the use of the chloro-alkanols as reactants in the preparation of foams having improved insulating and flame retardant properties.

SUMMARY OF THE INVENTION

In accordance with the present invention urethane-modified isocyanurate foams are prepared by (a) catalytically condensing an organic polyisocyanate with a polyol in the presence of a chloro-alkanol or by first preparing a modified polyisocyanate by the reaction of an organic polyisocyanate with a chloro-alkanol and thereafter catalytically condensing the prepolymer in the presence of a polyol. The modified polyisocyanates generally have a free isocyanate content of from 5 to 30 weight percent. The incorporation of chloro-alkanol moieties into the urethane-modified isocyanurate foam results in foams having improved insulating and flame-retardant properties.

DESCRIPTION OF THE PREFERRED EMBODIMENTS

As mentioned above, the present invention relates to the incorporation of certain chloro-alkanol moieties into a urethane-modified isocyanurate foam. The chlorinated alkanols which may be employed in the subject invention are those having from 2 to 5 carbon atoms in the alkanol chain. Representative compounds include 2,2,2-trichloroethanol, 3,3,3-trichloropropanol, 1,1,1-trichloro-2-propanol, 1,1-dichloro-2-methyl-2-propanol, 1,1,1-trichloro-2-methyl-2-propanol, 2,4,4,4-tetrachlorobutanol, and 3,5,5,5-tetrachloropentanol, and mixtures thereof. Generally from about 15 parts to 80 parts of chloro-alkanol per 100 parts of organic polyisocyanate will be employed in the process of the subject invention.

The organic polyisocyanates used in the preparation of the foams in accordance with the subject invention correspond to the formula:

wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanate; the aromatic tetraisocyanates such as 4,4'-dimethyldiphenylmethane-2,2'-5,5'-tetraisocyanate, and the like; arylalkyl polyisocyanates, such as xylylene diisocyanate; aliphatic polyisocyanates, such as hexamethylene-1,6-diisocyanate, lysine diisocyanate methyl ester and the like; and mixtures thereof. Other organic polyisocyanates include polymethylene polyphenyl polyisocyanate, hydrogenated methylene diphenyl diisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine.

Any organic compound having at least two active hydrogen atoms as determined by the well-known Zerewitinoff test, as described by Kohler in *Journal Of The American Chemical Society*, 49, 3181 (1927) may be employed in the subject invention. These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-terminated polyesters, polyalkylene polyether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propanediol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene polyether glycols, polypropylene polyether glycols, and polybutylene polyether glycols. The polyalkylene polyether polyols may be prepared by any known process such as, for example, the process disclosed by Wurtz in 1859 and *Encyclopedia Of Chemical Technology*, Vol. 7, pp. 257-262, published by Interscience Publishers, Inc (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylenepolyalkylene polyamine (crude methylene dianiline), p-aminoaniline, 1,5-diaminonaphthalene, and 2,4-diaminotoluene; aliphatic polyamines such as ethylenediamine, 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639, and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542. As is clear from the above, the particular polyol ingredient employed is not a critical aspect of the present invention. Any compound containing at least two reactive hydrogen atoms may be so used. Particularly preferred compounds are those having an equivalent weight between 100 and 1500. Generally, the amount of polyol employed will be from 10% to 80% by weight, preferably from 15% to 70% by weight, based on the weight of the organic polyisocyanate. Thus, the foams of the invention may be prepared employing an NCO/OH ratio of from 3:1 to 100:1, preferably from 4:1 to 25:1.

The catalyst system employed in the present invention comprises a trimerization catalyst and a urethane catalyst. Optionally, a compound which promotes carbodiimide linkages may also be employed. Representative compounds which promote carbodiimide linkages include aliphatic alcohols such as methyl alcohol and furfuryl alcohol; amino alcohols having a molecular weight of from 89 to 304 such as N,N-dialkylaminoalkanols, triethanolamine, N-(2-hydroxyethyl)morpholine and N,N,N',N'-tetrakis(2-hydroxypropyl) ethylenediamine and s-triazine compounds such as 2,4,6-tris(diethanolamino)-s-triazine, 2,4,6-tris(diisopropanolamino)-s-triazine, 2,4,6-tris(N-methylethanolamino)-s-triazine, and unsymmetrically substituted triazines of the formula:

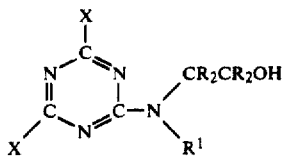

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy, alkyl of from 1 to 12 carbon atoms, phenyl, hydroxyl, halogen aziridyl, pyrrolidyl, piperidyl, or N-alkylpiperazyl. Since the triazines are unsymmetrically substituted, it is apparent that each X cannot concurrently be

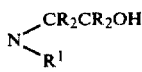

wherein each R and $R^1$ is the same. Generally up to 10 parts of carbodiimide-promoting compound per 100 parts of organic polyisocyanate will be employed in the subject invention.

Trimerization catalysts which are employed in the present invention include 1,3,5-tris(N,N-dialkylaminoalkyl)-s-hexahydrotriazines; the alkylene oxide and water adducts of 1,3,5-tris(N,N-dialkylaminoalkyl)-s-hexahydrotriazines; 2,4,6-tris(dimethylaminomethyl)phenol; o-, p- or a mixture of o- and p-dimethylaminomethylphenol and triethylenediamine or the alkylene oxide and water adducts thereof, alkali metal carboxylates, alkali metal alkoxides, and organic boron-containing compounds. These compounds are well known in the art, as is their use of catalysts which promote isocyanurate linkages.

1,3,5-Tris(N,N-dialkylaminoalkyl)-s-hexahydrotriazine compounds have heretofore been described as useful isocyanate trimerization catalysts. See U.S. Pat. No. 3,723,366, the disclosure of which is hereby incorporated by reference. Preferred within this group of hexahydrotriazine compounds is 1,3,5-tris(N,N-dimethylaminopropyl)-s-hexahydrotriazine.

The alkylene oxide and water adducts of a 1,3,5-tris(N,N-dialkylaminoalkyl)-s-hexahydrotriazine are presumably quaternary ammonium hydroxides. These compounds are generally prepared by reacting equimolar amounts of the hexahydrotriazine, alkylene oxide and water at a temperature of from about 10° C. to 80° C. for a period of from about five minutes to two hours. Preferred within this group of compounds is the propylene oxide and water adduct of 1,3,5-tris(N,N-dimethylaminopropyl)-s-hexahydrotriazine. See U.S. Pat. Nos. 3,746,709 and 3,766,103, the disclosures of which are hereby incorporated by reference.

2,4,6-Tris(dimethylaminomethyl)phenol as well as o-, p- and a mixture of o- and p-(dimethylaminomethyl)-phenol are known compounds which are commercially available products sold by Rohm & Haas under the trade names DMP-30 and DMP-10. Triethylenediamine and the alkylene oxide and water adducts thereof are also well known.

The amount of trimerization catalyst which may be employed in the present invention is generally from 0.1 part to 20 parts of catalyst per 100 parts of organic polyisocyanate.

Urethane catalysts which are employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. The preferred urethane-promoting catalyst is dibutyltin diacetate. Generally, the amount of the urethane-promoting catalyst employed will be from 0.01% to 10% by weight based on the weight of organic polyisocyanate.

The foams of the present invention are prepared by mixing together the organic polyisocyanate, the polyols, the chloro-alkanol, the catalysts and a blowing agent at an initiating temperature which, depending on the catalyst, will range from about 0° C. to 50° C. Alternatively, the foams may be prepared by reacting the organic polyisocyanate with the chloro-alkanol to form a modified polyisocyanate which is then mixed with a polyol in the presence of the catalysts and blowing agent at an initiation temperature between about 0° C. to 50° C. Under both conditions almost immediately an exotherm is developed within the reaction system and foam formation begins.

The present invention also contemplates the incorporation of additional ingredients in the foam formulation to tailor the properties thereof. Thus, plasticizers, surfactants, such as the silicone surfactants, e.g., alkylpolysiloxanes may be employed in the invention. Further additional ingredients include auxiliary or supplemental blowing agents, such as water or halohydrocarbons. Also, inorganic fillers, pigments and the like can be used.

In any event, the foams prepared in accordance herewith are rigid cellular products having a density of from about one pound to forty pounds per cubic foot which exhibit excellent strength and flame properties, such as fire resistance, low smoke evolution and excellent weight retention.

Following are specific, non-limiting examples which are provided to illustrate the enumerated principles described herein. All parts are by weight unless otherwise indicated. In the examples, the K-factors of the foams were determined in accordance with ASTM C518-177-45, the flame retardant properties by ASTM D-3104 and the friability properties by ASTM C-421. In the examples which follow, the following abbreviations are employed:

PAPI—polymethylene polyphenyl polyisocyanate
TDH—1,3,5-tris(N,N-dimethylaminopropyl)hexahydrotriazine
DBTDA—dibutyltin diacetate
DBTM—dibutyltin mercaptide FA—furfuryl alcohol DC-193—polyalkylsiloxane-polyoxyalkylene copolymer, a foam stabilizer F-11B—trichlorofluoromethane TCE—2,2,2-trichloroethanol TCB—2,4,4,4-tetrachlorobutanol Polyol A—A polyol prepared by the reaction of ethylene oxide with trimethylolpropane, said polyol having an equivalent weight of 250.

Polyol B—An ester-containing polyol prepared by the reaction of propylene oxide with the product of the reaction of one mole of tetrabromophthalic anhydride with one mole of the propylene oxide adduct of pentaerythritol, said polyol having an equivalent weight of 255.

Polyol C—A polyol prepared by the reaction of ethylene oxide with toluene diamine, said polyol having an equivalent weight of 126.

EXAMPLE I

A reaction vessel equipped with a stirrer, thermometer, heat exchange means and inlet means was charged with various amounts of polymethylene polyphenyl polyisocyanate. A chloro-alkanol was then added dropwise to the charge and the contents of the vessel were heated at 100° C. until the theoretical level of isocyanate was attained. The modified polyisocyanates obtained are presented in Table I below.

TABLE I

| Example I | A | B | C | D |
|---|---|---|---|---|
| Ingredients, parts | | | | |
| PAPI | 1000 | 1000 | 1000 | 1330 |
| TCE | 50 | 150 | 200 | — |
| TCB | — | — | — | 212 |
| Reaction Parameters | | | | |
| Reaction time, hr. | 1 | 2.5 | 3.5 | 1 |
| Reaction temperature, °C. | 100 | 100 | 100 | 100 |
| NCO, level %, theory | 28.2 | 23.3 | 21.2 | 24.5 |
| NCO, level, %, found | 28.7 | 23.3 | 21.2 | 24.5 |
| Viscosity, cps. at 25° C. | — | 1840 | 5300 | 1280 |

EXAMPLES II-VI

A series of foams was prepared by mixing under high speed stirring in a mold a stream of an organic polyisocyanate or the modified polyisocyanates described in Example I and a blowing agent with a stream containing a polyol, surfactants, catalysts and, in these instances, when the other stream contained an organic polyisocyanate, a chloroalkanol. The reactants employed, amounts thereof, reactivity profiles and properties of the resulting foams are presented in Table II below. In addition to the ingredients set forth in Table II as compared to prior art (Examples II-IV), in all of the Examples, 50 parts of F11B, 40 parts of Polyol A, 4 parts of TDH, 2 parts of DC-193, 0.5 parts of FA and 2.0 parts of DBTM were employed.

As the data in Table II illustrate, marked improvement in the K-factor of the foams is obtained in accordance with the process of the subject invention (Examples V-VI).

TABLE II

| Example | II | III | IV | V | VI |
|---|---|---|---|---|---|
| Ingredients, parts | | | | | |
| PAPI | 200 | 200 | 210A* | 200 | 230B* |
| TCE | — | 10 | — | 30 | — |
| Reactivity, sec. | | | | | |
| Cream time | 7 | 5 | 7 | 2 | 6 |
| Gel time | 50 | 30 | 53 | 13 | 53 |
| Tack-free time | 150 | 70 | 110 | 40 | 110 |
| Rise time | 155 | 105 | 125 | 65 | 110 |
| Properties | | | | | |
| Density, pcf. | 1.9 | 2.0 | 1.8 | 2.0 | 2.0 |
| K-factor, original | 0.143 | 0.134 | 0.142 | 0.114 | 0.132 |
| K-factor, aged 10 days at 140° F. | 0.200 | 0.171 | 0.173 | 0.140 | 0.151 |
| Friability, % wt. loss | 34 | 22 | 6 | 5 | 4 |
| Butler Chimney Test | | | | | |
| Wt. retained, % | 69 | 78 | 88 | 84 | 92 |
| Flame height, in. | 10 | 9 | 5 | 7 | 5 |
| Time to SX, sec. | 20 | 19 | 10 | 11 | 10 |

*A - Product prepared in Example IA
*B - Product prepared in Example IB

EXAMPLES VII-XI

A series of foams was prepared using a mixture of Polyols A and B and two different urethane-promoting catalysts. Examples VII and VIII are prepared employing PAPI as the isocyanate component while Examples IX-XI are prepared employing the products prepared from PAPI and trichloroethanol as described in Example I, B and C. In all preparations, 30 parts of Polyol A, 10 parts of Polyol B, 4 parts of TDH, 50 parts of F11-B, 2 parts of DC-193 and 0.5 part of FA were employed along with the other ingredients and amounts thereof set forth in Table III below. The improvement in K-factor and flame retardant properties with the increase in amount of trichloroethanol is apparent from the results presented in the Table.

TABLE III

| Example | VII | VIII | IX | X | XI |
|---|---|---|---|---|---|
| Ingredients, parts | | | | | |
| PAPI | 200 | 200 | — | — | — |
| Product of Example | — | — | IB230 | IB230 | IC240 |
| DBTM | 2.0 | — | 2.0 | — | 2.0 |
| DBTDA | — | 0.2 | — | 0.2 | — |
| Reactivity, secs. | | | | | |
| Cream time | 7 | 7 | 9 | 7 | 6 |
| Gel time | 55 | 35 | 55 | 58 | 55 |
| Tack-free time | 175 | 130 | 90 | 110 | 110 |
| Rise time | 125 | 80 | 115 | 125 | 150 |
| Properties | | | | | |
| Density, pcf. | 1.9 | 1.9 | 2.1 | 2.1 | 2.2 |
| K-factor, initial | 0.143 | 0.133 | 0.131 | 0.131 | 0.119 |
| K-factor, aged 10 days at 140° F. | 0.189 | 0.180 | 0.151 | 0.151 | 0.148 |
| Friability, % wt. loss | 25 | 21 | 9 | 7 | 10 |
| Butler Chimney Test | | | | | |
| Wt. retained, % | 82 | 69 | 92 | 91 | 91 |
| Flame ht., in. | 10 | 10 | 5 | 5 | 5 |
| Time to SX, sec. | 14 | 16 | 10 | 10 | 10 |

EXAMPLE XII

Two foams were prepared in the manner described in the previous Examples. After the foams were made, they were post-cured for 15 minutes at 100° C. The sole difference in the preparations was that in Foam A, 30 parts of Polyol A was employed while in Foam B, 30 parts of Polyol C was employed. Other ingredients employed and amounts thereof were:

| Ingredients | Parts |
|---|---|
| Prepolymer of Ex. 1D | 232 |
| F-11B | 55 |
| DC-193 | 2 |
| TDH | 6 |
| DBTDA | 0.2 |
| FA | 0.5 |
| Polyol B | 10 |

The reactivity profiles of the formulations and physical properties of the foams are as follows.

| Foam | A | B |
|---|---|---|
| Reactivity, secs. | | |
| Cream time | 6 | 7 |
| Gel time | 50 | 25 |
| Rise time | 110 | 50 |
| Tack-free time | 90 | 30 |
| Properties | | |
| Density, pcf. | 2.6 | 2.1 |
| Compressive strength, psi. | | |
| 10% defl. | 27 | 23 |
| K-factor | | |
| initial | 0.111 | 0.112 |
| aged 10 days at 140° F. | 0.125 | 0.131 |
| Friability | | |
| % wt. loss | 8 | 7 |
| Butler Chimney test | | |
| wt. retained, % | 92 | 89 |
| flame ht., inches | 7 | 7 |
| time to SX, sec. | 10 | 11 |

The embodiments of the invention in which an exclusive property or privilege is claimed are defined as follows:

1. A urethane-modified isocyanurate foam prepared by catalytically condensing in the presence of a blowing agent and employing an NCO/OH ratio of from 3:1 to 100:1, (a) a polyol with an organic polyisocyanate in the presence of from 15 to 80 parts per 100 parts of organic polyisocyanate of 2,2,2-trichloroethanol or (b) a polyol with a modified polyisocyanate having a free isocyanate content of from 5 to 30 weight percent obtained by the reaction of an organic polyisocyanate with from 15 to 80 parts per 100 parts of organic polyisocyanate of said 2,2,2-trichloroethanol.

2. A process of preparing a urethane-modified isocyanurate foam having improved insulating properties which comprises catalytically condensing, in the presence of a blowing agent and employing an NCO/OH ratio of from 3:1 to 100:1, (a) a polyol with an organic polyisocyanate in the presence of from 15 parts to 80 parts per 100 parts of polyisocyanate of 2,2,2-trichloroethanol or (b) a polyol with a modified polyisocyanate having a free isocyanate content of from 5 to 30 weight percent obtained by the reaction of an organic polyisocyanate with from 15 to 80 parts per 100 parts of organic polyisocyanate of said 2,2,2-trichloroethanol.

3. The process of claim 3 wherein the organic polyisocyanate is polymethylene polyphenyl polyisocyanate.

4. The process of claim 2 wherein the polyol is an ethylene oxide adduct of a polyhydric alcohol.

5. The process of claim 2 wherein the condensation is carried out in the presence of a catalyst system comprising 1,3,5-tris(N,N-dimethylaminopropyl)-hexahydrotriazine, furfuryl alcohol and dibutyltin diacetate.

* * * * *